(12) United States Patent
Takahata

(10) Patent No.: US 9,929,398 B2
(45) Date of Patent: Mar. 27, 2018

(54) LITHIUM-ION SECONDARY BATTERY AND METHOD OF MANUFACTURING THE SAME

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 617 days.

(21) Appl. No.: 14/235,599

(22) PCT Filed: Jul. 29, 2011

(86) PCT No.: PCT/JP2011/067534
§ 371 (c)(1),
(2), (4) Date: Jan. 28, 2014

(87) PCT Pub. No.: WO2013/018179
PCT Pub. Date: Feb. 7, 2013

(65) Prior Publication Data
US 2014/0170501 A1    Jun. 19, 2014

(51) Int. Cl.
*H01M 4/04* (2006.01)
*H01M 4/583* (2010.01)
(Continued)

(52) U.S. Cl.
CPC ......... *H01M 4/0404* (2013.01); *H01M 4/133* (2013.01); *H01M 4/1393* (2013.01);
(Continued)

(58) Field of Classification Search
CPC .. H01M 4/0404; H01M 4/133; H01M 4/1393; H01M 4/366; H01M 4/583; H01M 4/587; H01M 10/0525
See application file for complete search history.

(56) References Cited

U.S. PATENT DOCUMENTS 7,829,222 B2 * 11/2010 Takei ............... C01B 31/04
                                                29/623.1
7,892,222 B2 *  2/2011 Vardi ............... A61F 2/022
                                                604/500
(Continued)

FOREIGN PATENT DOCUMENTS

JP    10-302774     11/1998
JP    2002-241117    8/2002
(Continued)

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

A Lithium-ion secondary battery (100A) has a negative electrode current collector (241A) and a negative electrode active material layer (243A) coated on the negative electrode current collector (241A). The negative electrode active material layer (243A) contains negative electrode active material particles (710A). The negative electrode active material particles (710A) include graphite particles each at least partially covered by an amorphous carbon film (750). The weight ratio X of the amorphous carbon film (750) in the negative electrode active material particles (710A) is $0.02 \leq X \leq 0.06$. The negative electrode active material particles (710A) have a linseed oil absorption number Y (mL/100 g) of $35$ (mL/100 g) $\leq Y \leq 70$ (mL/100 g).

6 Claims, 14 Drawing Sheets

(51) Int. Cl.
  *H01M 4/1393* (2010.01)
  *H01M 4/587* (2010.01)
  *H01M 4/133* (2010.01)
  *H01M 10/0525* (2010.01)
  *H01M 4/36* (2006.01)

(52) U.S. Cl.
  CPC ........... *H01M 4/366* (2013.01); *H01M 4/583* (2013.01); *H01M 4/587* (2013.01); *H01M 10/0525* (2013.01); *Y02T 10/7011* (2013.01)

(56) References Cited

U.S. PATENT DOCUMENTS

| | | | |
|---|---|---|---|
| 2004/0229125 A1* | 11/2004 | Zou | C01B 31/04 429/231.8 |
| 2008/0081263 A1* | 4/2008 | Saisho | H01M 4/131 429/338 |
| 2008/0274406 A1 | 11/2008 | Fuse et al. | |
| 2009/0123850 A1* | 5/2009 | Takeuchi | H01M 4/0433 429/342 |
| 2011/0143216 A1 | 6/2011 | Yoshida et al. | |
| 2013/0130117 A1 | 5/2013 | Yamamoto et al. | |
| 2014/0093781 A1 | 4/2014 | Nishihara et al. | |

FOREIGN PATENT DOCUMENTS

| | | |
|---|---|---|
| JP | 2004-265754 | 9/2004 |
| JP | 2005-294011 | 10/2005 |
| JP | 2006-049288 | 2/2006 |
| JP | 2008-016242 | 1/2008 |
| JP | 2009-211818 | 9/2009 |
| JP | 2010-092649 | 4/2010 |
| JP | 2010-251060 | 11/2010 |
| JP | 2011-142066 | 7/2011 |
| WO | WO 2011/125577 | 10/2011 |
| WO | WO 2012/137770 | 10/2012 |

* cited by examiner

LITHIUM-ION SECONDARY BATTERY AND METHOD OF MANUFACTURING THE SAME

CROSS-REFERENCE TO RELATED APPLICATIONS

This application is a national phase application of International Application No. PCT/JP2011/067534, filed Jul. 29, 2011, the content of which is incorporated herein by reference.

TECHNICAL FIELD

The present invention relates to a lithium-ion secondary battery and a method of manufacturing the battery.

BACKGROUND ART

A method of manufacturing a lithium-ion secondary battery is disclosed in, for example, Patent Literature 1, JP 1998-302774 A, in which graphite powder in a paste form is coated onto a copper foil and thereafter dried to obtain an electrode as a negative electrode. According to this publication, an electrode with the same structure is obtained also as the positive electrode. Then, the negative electrode, a separator, the positive electrode, and a separator are stacked in that order, and these are coiled in a cylindrical shape, to thereby prepare a wound electrode assembly. The wound electrode assembly and an electrolyte solution are placed into a battery case, whereby a battery is fabricated.

The just-mentioned Patent Literature 1 proposes the use of graphite powder having a powder bulk density of 0.5 g/cm$^3$ and an oil absorption number of 65 (mL/100 g), for the graphite powder used as the negative electrode active material.

Patent Literature 2, IP 2004-265754 A, discloses the use, as a negative electrode active material, of a composite carbon material in which the surfaces of carbonaceous particles serving as the core are coated with amorphous carbon. It is disclosed therein that the coating amount of the amorphous carbon is set to be from 0.1 mass % to 15.0 mass % with respect to the mass of the carbonaceous particles serving as the core. It is also disclosed that the content of the composite carbon material should be set at 30 mass % or greater with respect to the mass of the negative electrode active material.

Patent literature 3, IP 2005-294011 A, proposes the use of a mixture of graphite particles the surfaces of which are not coated with amorphous carbon and graphite particles the surfaces of which are coated with amorphous carbon, for the graphite particles contained as the active material in the negative electrode. It also proposes that in the graphite particles the surfaces of which are coated with amorphous carbon, the mass of the amorphous carbon is 0.1 parts to 10 parts by mass.

Patent Literature 4, JP 2009-211818 A, uses, as the negative electrode active material of a non-aqueous electrolyte secondary battery, particles in which the surfaces of graphite particles are coated with amorphous carbon and the coating amount thereof is 0.1 mass % to 10 mass % with respect to the amount of graphite. It is proposed therein to use, as the amorphous carbon, a substance having a specific surface area of from 200 m$^2$/g to 500 m$^2$/g, when sintered alone, and having a molecular weight of from 300 to 500.

CITATION LIST

Patent Literature

[Patent Literature 1] JP 1998-302774 A
[Patent Literature 2] JP 2004-256754 A
[Patent Literature 3] IP 2005-294011 A
[Patent Literature 4] JP 2009-211818 A

SUMMARY OF INVENTION

Technical Problem

In the negative electrode of the lithium-ion secondary battery, a current collector (for example, a copper foil for the negative electrode) is coated with a negative electrode active material layer containing negative electrode active material particles, as described above. When forming the negative electrode active material layer, a mixture in paste form is prepared by mixing negative electrode active material particles and a binder together in a solvent. Then, the prepared mixture is coated onto a current collector, then dried, and press-rolled. At this time, when the proportion of the solvent is large in the paste-like mixture, the drying process requires a long time and high energy. In order to keep the manufacturing cost of the lithium-ion secondary battery low, it is desirable to reduce the time and energy required in the drying step. For this reason, it is preferable to increase the concentration of the solid content in the mixture so that the proportion of the solvent can be reduced.

In such a lithium-ion secondary battery, lithium ions are transferred between the active material and the electrolyte solution during charge and discharge. Therefore, when the active material is made of a material having higher affinity with the electrolyte solution, lithium ions can be more easily transferred, and the resistance can be kept lower. The oil absorption number is used as the indicator for evaluating the affinity of an active material with an electrolyte solution. An active material having a high oil absorption number is used in order to keep the resistance of the lithium-ion secondary battery low.

However, when the concentration of the solid content in the mixture is increased in addition to the use of an active material having a high oil absorption number, dilataney is likely to occur in the paste-like mixture, which is prepared when forming the electrode active material layer. Such a paste-like mixture is passed through a filter in order to remove foreign matters, or through a die in order to adjust the basis weight appropriately in the coating process. If dilataney occurs in such cases, it can be a cause of clogging.

Solution to Problem

A lithium-ion secondary battery according to the present invention has a negative electrode current collector and a negative electrode active material layer coated on the negative electrode current collector. The negative electrode active material layer contains negative electrode active material particles. The negative electrode active material particles include graphite particles each at least partially covered by an amorphous carbon film. The weight ratio X of the amorphous carbon film in the negative electrode active material particles is 0.02≤X≤0.06. Moreover, it is desirable that the negative electrode active material particles have a linseed oil absorption number Y (mL/100 g) of 35 (mL/100 g)≤Y≤70 (mL/100 g). Such a configuration allows the lithium-ion secondary battery to achieve both a low resistance and a manufacturing cost.

In this case, the negative electrode active material particles may have a linseed oil absorption number Y (mL/100 g) of Y≤69 (mL/100 g), for example. This can inhibit dilataney from occurring in the negative electrode mixture.

Moreover, the negative electrode active material particles may have a linseed oil absorption number Y (mL/100 g) of 54 (mL/100 g)≤Y. This makes it possible to keep the resistance and the resistance increase rate of the lithium-ion secondary battery low.

The negative electrode active material particles may include graphite particles each at least partially covered by an amorphous carbon film, and the weight ratio X of the amorphous carbon film in the negative electrode active material particles may be X≤0.05.

A method of manufacturing a lithium-ion secondary battery comprises: a step A of preparing a negative electrode mixture in which the negative electrode active material particles and a binder are mixed in a solvent; a step B of coating the negative electrode mixture prepared in step A onto the negative electrode current collector; and a step C of drying the negative electrode mixture coated on the negative electrode current collector coated in step B. In this case, it is desirable that the negative electrode active material particles include graphite particles each at least partially covered by an amorphous carbon film. Here, it is desirable that the weight ratio X of the amorphous carbon film in the negative electrode active material particles be 0.02≤X≤0.06. Moreover, it is desirable that the negative electrode active material particles have a linseed oil absorption number Y (mL/100 g) of 35 (mL/100 g)≤Y≤70 (mL/100 g). Furthermore, it is desirable that the negative electrode mixture prepared in step A have a solid content concentration N of 52(%)≤N. This makes it possible to inhibit dilatancy from occurring in the negative electrode mixture and to provide a lithium-ion secondary battery showing low resistance.

In this case, the negative electrode mixture prepared in step A may have a solid content concentration N of N≤60 (%).

The negative electrode mixture prepared in step A may have a viscosity difference (G2−G1) of <0, wherein the viscosity difference (G2−G1) is a difference between a viscosity G1 at a shear rate of 10 (s$^{-1}$) as determined by a B-type viscometer and a viscosity G2 at a shear rate of 300 (s$^{-1}$) as determined by a B-type viscometer.

The negative electrode mixture prepared in step A may have a difference (N2−N1) of <2(%), the difference (N2−N1) being determined after the negative electrode mixture is placed in a container up to a depth of about 50 mm from the bottom thereof and set aside for 84 hours, where N1 is the solid content concentration of the negative electrode mixture obtained from a surface layer portion and N2 is the solid content concentration of the negative electrode mixture obtained from a bottom of the container.

The negative electrode mixture prepared in step A may have a viscosity G of G≤7000 (mPa·s) at a shear rate of 20 (s$^{-1}$) as determined by a B-type viscometer. Herein, the unit "mPa·s" may be converted as: 1000 mPa·s=1 Pa·s=1 kg/(m·s$^2$).

The negative electrode mixture prepared in step A may have a viscosity G of 3000 (mPa·s)≤G at a shear rate of 20 (s$^{-1}$) as determined by a B-type viscometer.

In step A, the amount Z (mL/100 g) of the solvent mixed per 100 g of the negative electrode active material particles may be adjusted, with respect to the linseed oil absorption number Y (mL/100 g) of the negative electrode active material particles, so as to be (Y+1)≤Z≤(Y+10).

DESCRIPTION OF EMBODIMENTS

Here, an example of the structure of a lithium-ion secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

Figure 1:
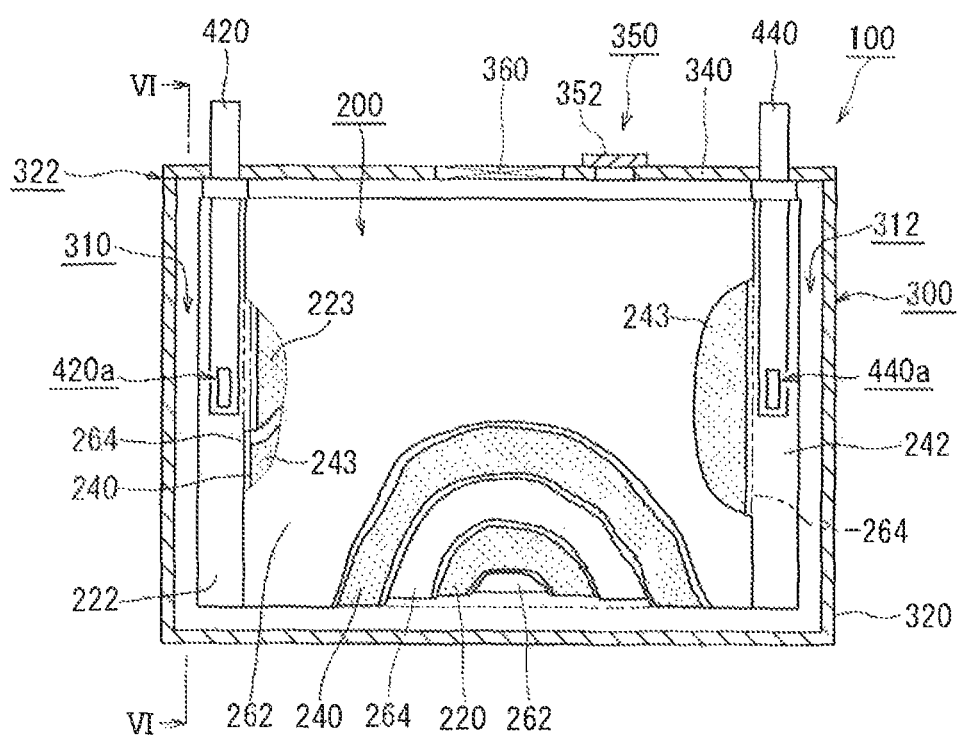
FIG. 1 is a view illustrating one example of the structure of a lithium-ion secondary battery.
Figure 2:
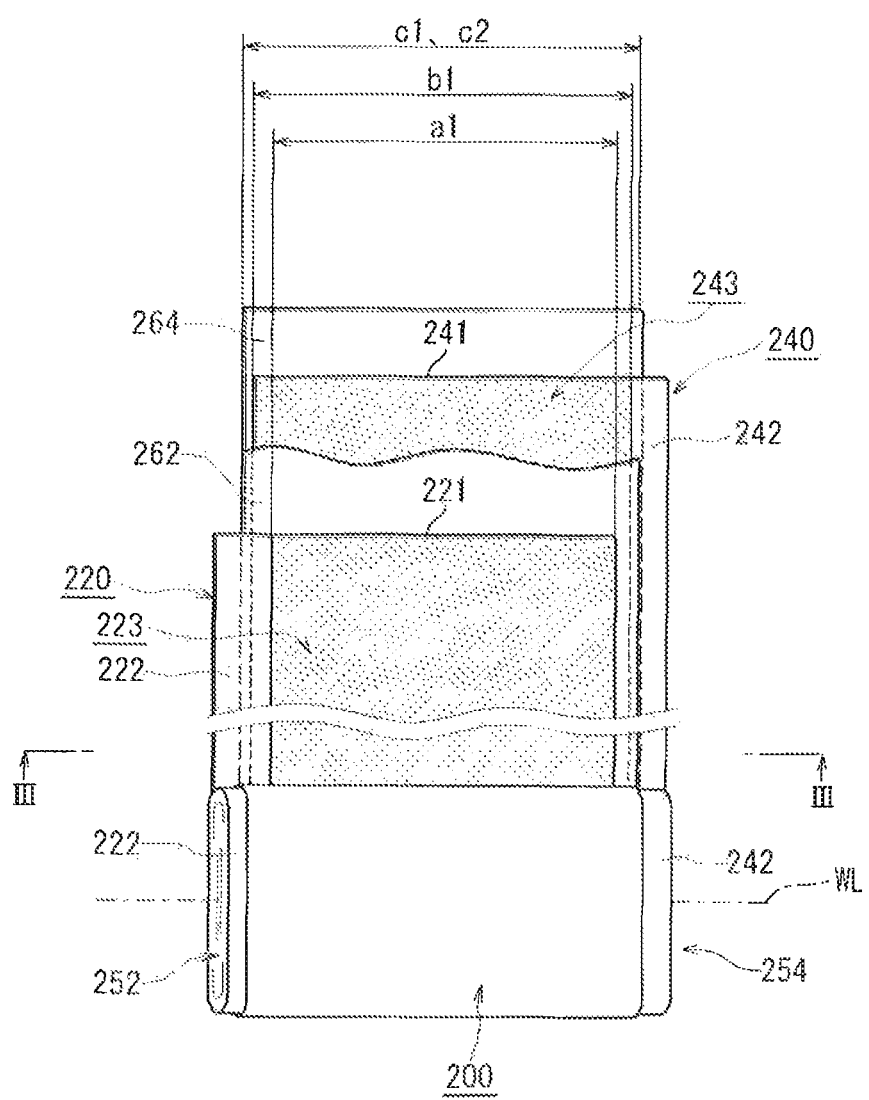
FIG. 2 is a view illustrating a wound electrode assembly of the lithium-ion secondary battery.
Figure 3:
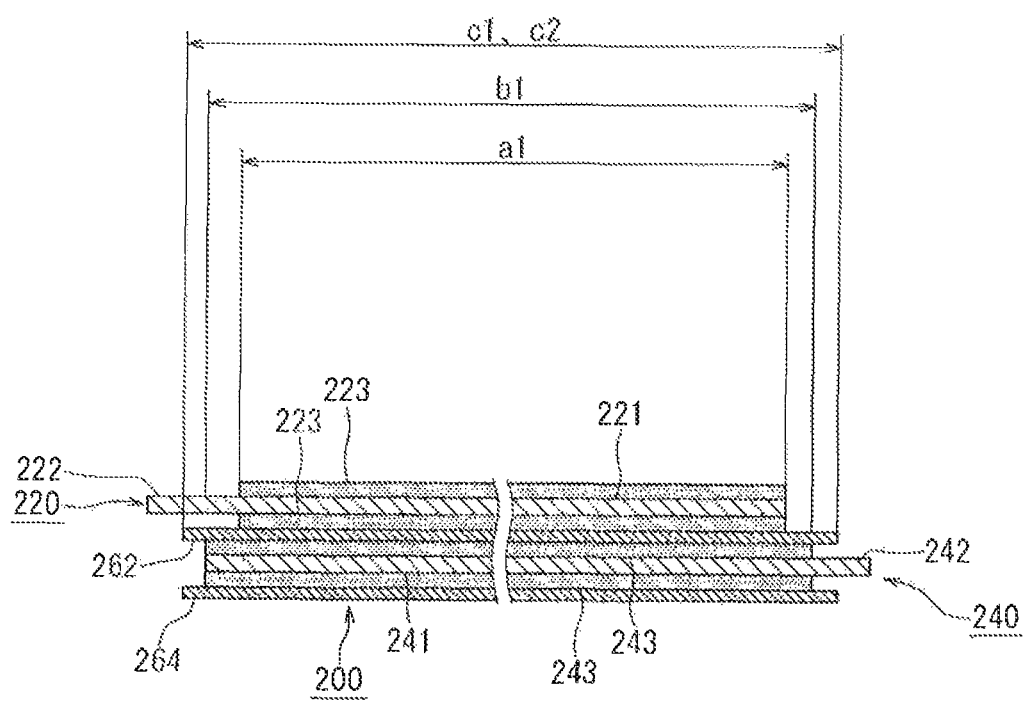
FIG. 3 is a cross-sectional view taken along line III-III in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 and a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 μm. An uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current, collector 221, in the example shown in the figure. The positive electrode active material layer 223 contains a positive electrode active material. The positive electrode mixture layer 223 is formed by coating a positive electrode mixture containing the positive electrode active material onto the positive electrode current collector 221.

<<Positive Electrode Active Material Layer 223 and Positive Electrode Active Material Particles 610>>

Figure 4:
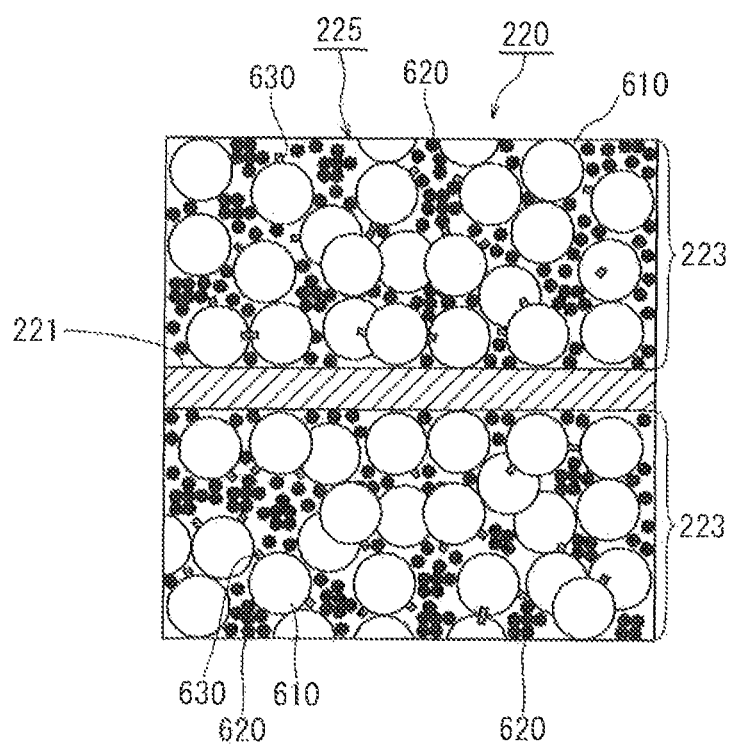
FIG. 4 is a cross-sectional view illustrating the structure of a positive electrode active material layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that, the structure of the positive electrode active material layer 223 can be shown clearly. As illustrated in FIG. 4, the positive electrode active material layer 223 contains the positive electrode active material particles 610, the conductive agent 620, and the binder 630.

Various types of substances that can be used as the positive electrode active material of lithium-ion secondary batteries may be used for the positive electrode active material particles 610. Examples of the positive electrode active material particles 610 include lithium transition metal oxides, such as $LiNiCoMnO_2$ (lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFeO_4$ may have, for example, an olivine structure. The $LiFePO_4$ with an olivine structure may have, for example, particles in the range of nanometers. The $LiFePO_4$ with an olivine structure may further be coated with a carbon film.

<<Conductive Agent 620>>

Examples of the conductive agent 620 include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: the positive electrode active material particles 610 and the conductive agent 620 mentioned above are mixed into a paste form (slurry form) in a solvent to prepare a positive electrode mixture, which is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. A strip-shaped copper foil having a predetermined width and a thickness of about 10 μm is used for this negative electrode current collector 241. An uncoated portion 242 is provided along one lateral-side edge of the negative electrode current collector 241. The negative electrode active material layer 243 is formed on both faces of the negative electrode current collector 241 except for the uncoated portion 242, which is provided in the negative electrode current collector 241. The negative electrode mixture layer is retained by the negative electrode current collector 241, and contains at least a negative electrode active material. In the negative electrode active material layer 243, a negative electrode mixture containing a negative electrode active material is coated on the negative electrode current collector 241.

<<Negative Electrode Active Material Layer 243>>

Figure 5:
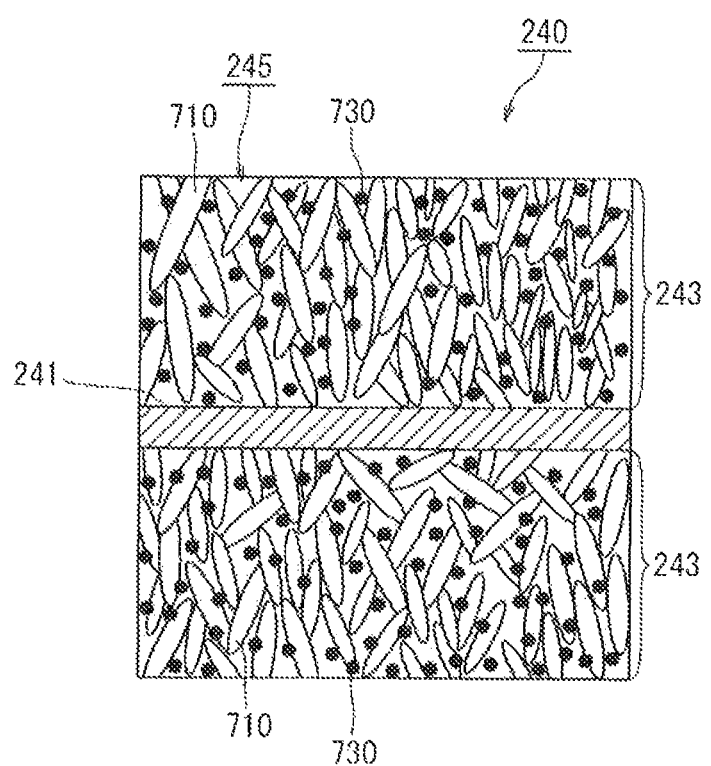
FIG. 5 is a cross-sectional view illustrating the structure of a negative electrode active material layer.

FIG. 5 is a cross-sectional view of the negative electrode sheet 240 of the lithium-ion secondary battery 100. As illustrated in FIG. 5, the negative electrode active material layer 243 contains negative electrode active material particles 710, a thickening agent (not shown), a binder 730, and the like. In FIG. 5, the negative electrode active material particles 710 and the binder 730 in the negative electrode active material layer 243 are enlarged schematically so that the structure of the negative electrode active material layer 243 can be shown clearly.

<<Negative Electrode Active Material>>

As the negative electrode active material particles 710, it is possible to use any conventional material used for lithium-ion secondary batteries, either alone or in combination, without any particular limitation. Examples include particulate carbon materials (carbon particles) at least partially containing a graphite structure (a layered structure). More specifically, the negative electrode active material may be natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material particle 710, but the negative electrode active material particle 710 is not limited to the example shown in the figure.

<<Thickening Agent and Solvent>>

The negative electrode active material layer 243 is formed, for example, in the following manner: the negative electrode active material particles 710 and the binder 730 mentioned above are mixed into a paste form (slurry form) in a solvent to prepare a negative electrode mixture, which is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The above-mentioned examples of the polymer materials used as the binder 630 of the positive electrode active material layer 223 can also be used for the purpose of obtaining the function as an addition agent, such as a thickening agent for the positive electrode mixture, in addition to the function as the binder.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243. The insulative particles may be made of an insulative inorganic filler (for example, a filler of metal oxide or metal hydroxide) or insulative resin particles (for example, particles of polyethylene or polypropylene).

<<Battery Case 300>>

In this example, as illustrated in FIG. 1, the battery case 300 is what is called a prismatic, battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. For this reason, a lightweight metal such as aluminum or an aluminum alloy (aluminum in this example) is employed for the case main body 320 and the lid 340, which constitute the battery case 300, in this embodiment. This enables to improve the weight energy efficiency.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
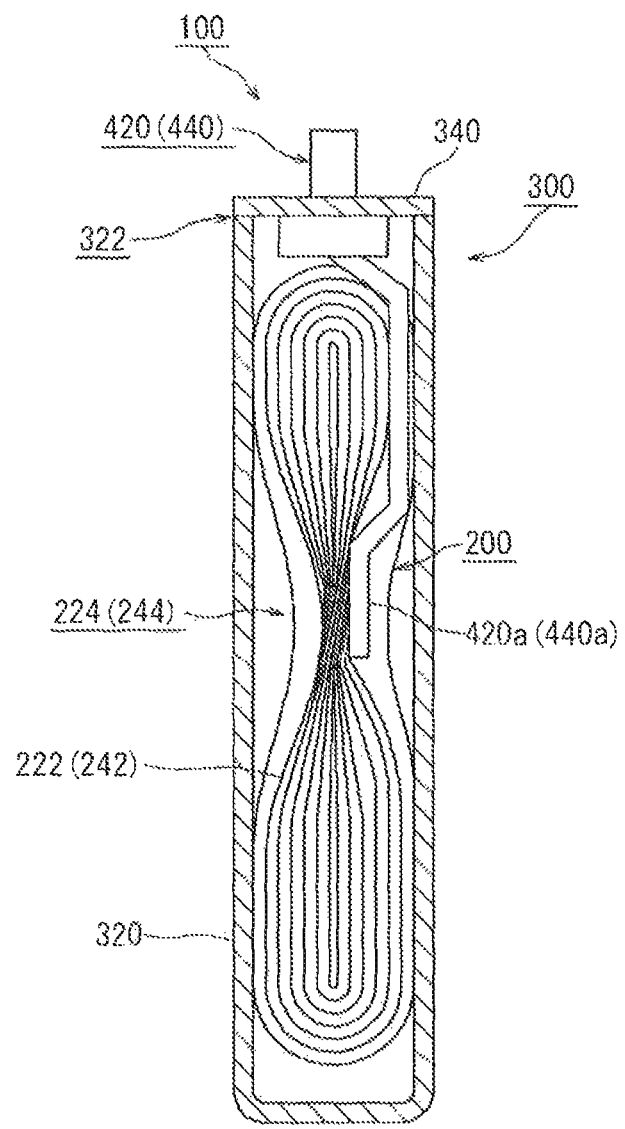
FIG. 6 is a side view illustrating a portion where an uncoated portion of the wound electrode assembly is welded to an electrode terminal.

As illustrated in FIG. 2, the wound electrode assembly 200 is deformed into a flat shape in one direction perpendicular to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line V1-V1 in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. In this example, the electrolyte solution is an electrolyte solution in which $LiPF_6$ is contained at a concentration of about 1 mol/L in a mixed solvent of ethylene carbonate and diethyl carbonate (e.g., a mixed solvent with a volume ratio of about 1:3). Thereafter, a metal sealing cap 352 is attached (welded, for example) to the filling port 350 to seal the battery case 300. It should be noted that the electrolyte solution is not limited to the example of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps, which may be called voids, for example, between the particles of the negative electrode active material particles 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360, In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation During Charge>>

Figure 7:
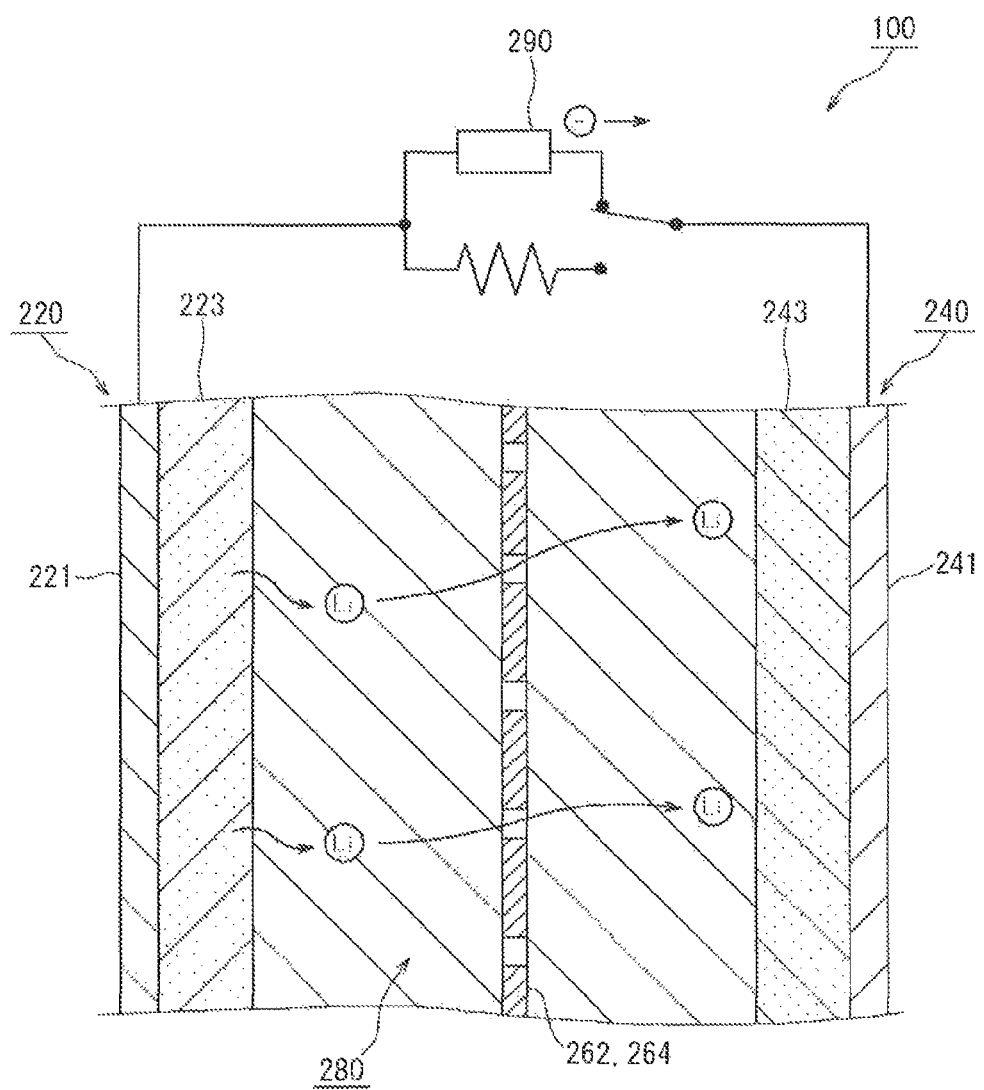
FIG. 7 is a view schematically illustrating a state of the lithium-ion secondary battery during charge.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode sheet 240. In the negative electrode sheet 240, electric charge is stored, and also the lithium ions (Li) in the electrolyte solution 280 are absorbed and stored in the negative electrode active material within the negative electrode active material layer 243.

<<Operation during Discharge>>

Figure 8:
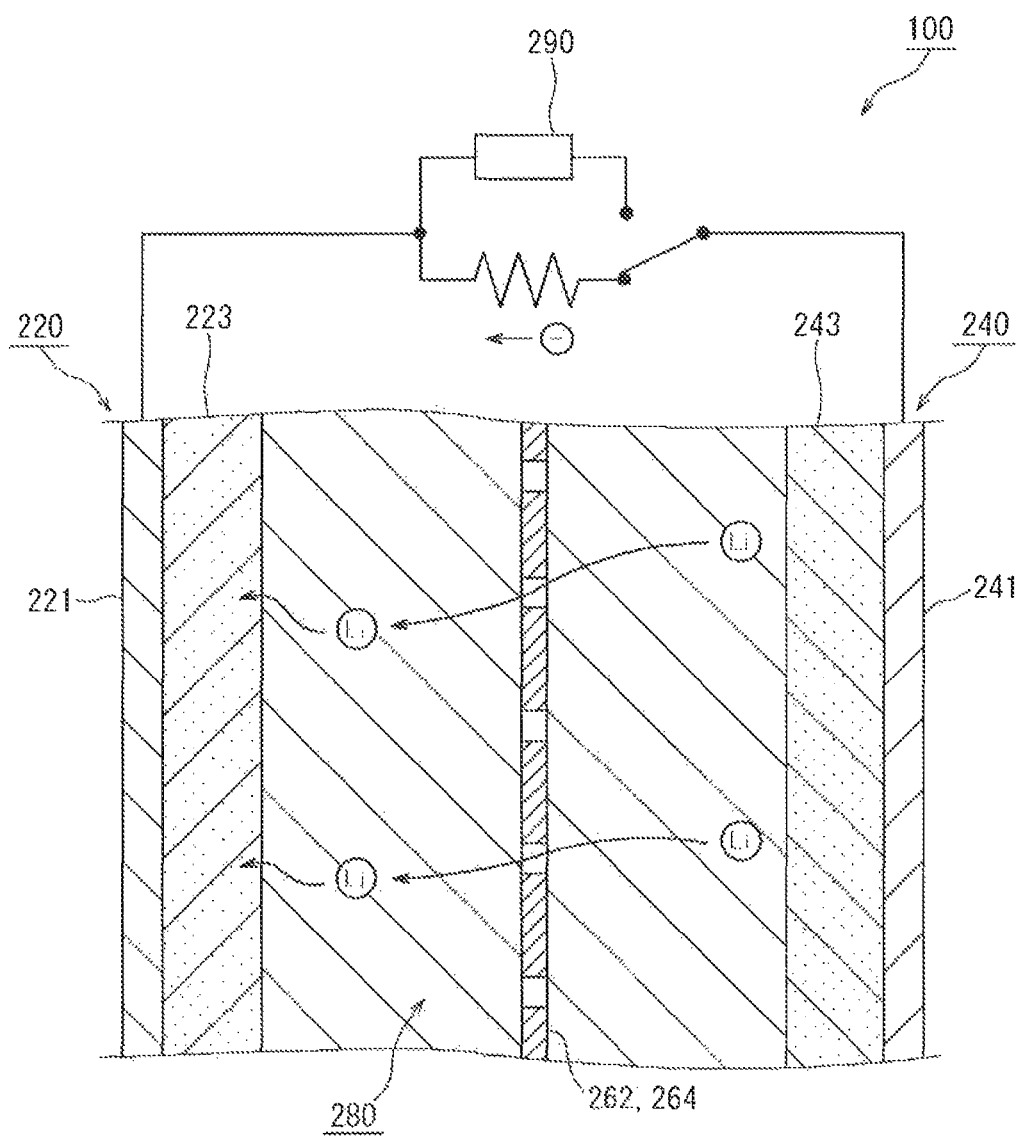
FIG. 8 is a view schematically illustrating a state of the lithium-ion secondary battery during discharge.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. Also, in the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiment. In addition, the electrode sheet, in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

Hereinbelow, a lithium-ion secondary battery according to one embodiment of the present invention will be described. The lithium-ion secondary battery described here has the same basic structure as that of the foregoing lithium-ion secondary battery 100. Therefore, the description will be made with reference to the drawings of the foregoing lithium-ion secondary battery 100 as appropriate.

Now, as illustrated in FIG. 5, for example, the negative electrode active material layer 243 contains the negative electrode active material particles 710. In this case, by using negative electrode active material particles 710 having a high oil absorption number, the negative electrode active material particles 710 are allowed to have high affinity with the electrolyte solution. When the negative electrode active material particles 710 have high affinity with the electrolyte solution, lithium ions are transferred easily. As a result, the resistance of the lithium-ion secondary battery can be kept low. Moreover, when the negative electrode active material particles 710 have high affinity with the electrolyte solution, the cycle life deterioration (the tendency of the resistance of a lithium-ion secondary battery to increase due to repetitive charging and discharging) can be suppressed to a low level. Furthermore, employing graphite particles each covered by an amorphous carbon film as the negative electrode active material particles 710 makes it possible to prevent decomposition of the electrolyte solution in the negative electrode and thereby suppress the cycle life deterioration to a low level.

Meanwhile, the negative electrode mixture that is prepared when forming the negative electrode active material layer 243 is coated onto the negative electrode current collector 241 and thereafter dried by passing the resultant article through a drying oven. At this time, in order to keep the energy cost required for drying the negative electrode mixture, it is desirable that the solid content concentration of the negative electrode mixture be high. However, when the solid content concentration of the negative electrode mixture is made high, dilatancy is likely to occur easily in the negative electrode mixture. In particular, when negative electrode active material particles 710 having a high oil absorption number are used, dilatancy is likely to occur more easily in the negative electrode mixture. For this reason, it is not easy to use negative electrode active material particles 710 having a high oil absorption number simply.

As described above, in order to keep the resistance and the resistance increase-rate low, it is desirable for the lithium-ion secondary battery 100 to use negative electrode active material particles 710 having a high oil absorption number. However, in order to use negative electrode active material particles 710 having a high oil absorption number, it is necessary to make the solid content concentration of the negative electrode mixture high, and accordingly, it is likely to increase the manufacturing cost of the lithium-ion secondary battery 100.

<<Lithium-Ion Secondary Battery 100A>>

Figure 9:
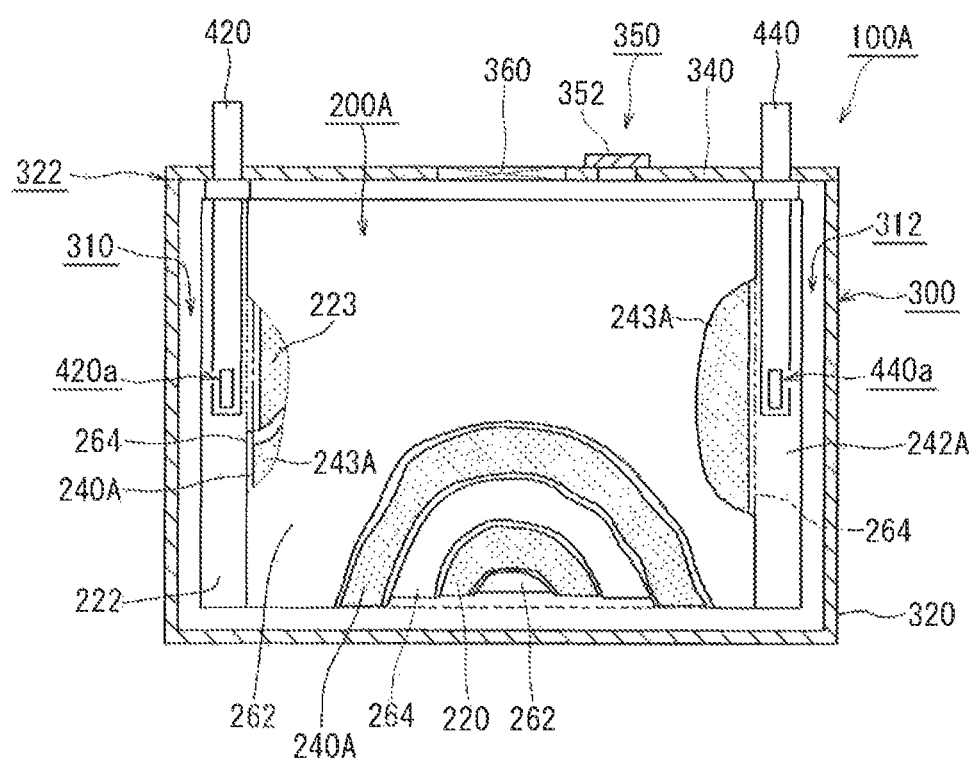
FIG. 9 is a view illustrating a lithium-ion secondary battery according to one embodiment of the present invention.
Figure 10:
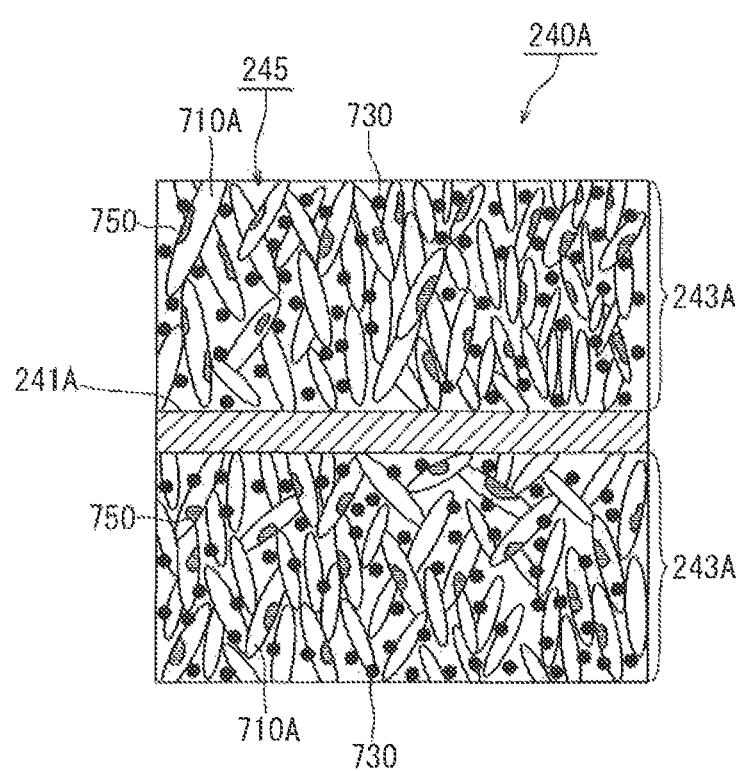
FIG. 10 is a cross-sectional view illustrating the negative electrode sheet in a lithium-ion secondary battery according to one embodiment of the present invention.

FIG. 9 illustrates a lithium-ion secondary battery 100A according to one embodiment of the present invention. Referring to FIG. 9, in one embodiment of the present invention, the structure of the negative electrode sheet 240A is different from that of the lithium-ion secondary battery 100 shown in FIG. 1. The uncoated portion of the negative electrode sheet 240A is denoted by reference character 242A. FIG. 10 is a cross-sectional view of the negative electrode sheet 240A of the lithium-ion secondary battery 100A. In FIG. 10, the negative electrode current collector of the negative electrode sheet 240A is denoted by reference character 241A.

In this embodiment, negative electrode active material particles 710A contained in a negative electrode active material layer 243A include graphite particles each at least partially covered by the amorphous carbon film 750, as illustrated in FIG. 10. The weight ratio X of the amorphous carbon film 750 contained in the negative electrode active material particles 710A is $0.02 \leq X \leq 0.06$. Furthermore, the negative electrode active material particles 710A contained in the negative electrode active material layer 243A have a linseed oil absorption number Y (mL/100 g) of 35 (mL/100 g)$\leq Y \leq$70 (mL/100 g).

<<Graphite Particles>>

Here, graphite particles are used as the core of the negative electrode active material particles 710A each covered by the amorphous carbon film 750. An example of such graphite particles is natural graphite.

<<Amorphous Carbon Film 750>>

The amorphous carbon film 750 is a film made of an amorphous carbon material. For example, the graphite particles at least partially covered by the amorphous carbon film 750 can be obtained by mixing pitch with graphite particles that serve as the core of the negative electrode active material particles 710A and baking the mixture.

<<Weight Ratio X of Amorphous Carbon Film 750>>

The weight ratio X of the amorphous carbon film 750 in the negative electrode active material particles 710A may be determined, for example, according to a TG analysis in thermogravimetry and differential thermal analysis (TG/DTA). Specifically, TG is obtained by placing the negative electrode active material particles 710A in a heating furnace, and recording changes of the weight of the sample with respect to an increase in the ambient temperature. In this case, the amorphous carbon film 750 in the negative electrode active material particles 710A is burned out at a predetermined temperature, so the weight of the negative electrode active material particles 710A decreases. The weight ratio X may be obtained by dividing the decrement of the weight of the negative electrode active material particles 710A at the predetermined temperature by the weight of the negative electrode active material particles 710A prior to the heating. Such a weight ratio X of the amorphous carbon film 750 indicates the amount of the amorphous carbon film 750 with respect to the amount of the negative electrode active material particles 710A, which may also be called the "coating amount".

Weight ratio X=(Decrement of the weight of the negative electrode active material particles 710A determined by TG analysis)/(Weight of the negative electrode active material particles 710A prior to the heating)

For example, a predetermined amount of pitch is mixed with the graphite particles serving as the core of the negative electrode active material particles 710A, and the mixture is baked, to obtain a sample of graphite particles whose coating amount is known. Then, the obtained sample of graphite particles, the coating amount of which is known, is subjected to a TG analysis in thermogravimetry and differential thermal analysis (TG/DTA), to determine the decrement of the weight of the negative electrode active material particles 710A according to the TG analysis. Thereby, the correlation between the coating amount, which indicates the amount of the amorphous carbon film 750 with respect to the negative electrode active material particles 710A, and the decrement of the weight of the negative electrode active material particles 710A determined by the TG analysis is obtained in advance. Then, for another sample of negative electrode active material particles 710A whose coating amount is unknown, the decrement of the weight of the negative electrode active material particles 710A is measured by a TG analysis per unit weight. Then, the measured decrement may be applied to the correlation relationship that has been obtained previously. In this way, it is possible to estimate the coating amount of the sample of the negative electrode active material particles 710A whose coating amount has been unknown.

<<Linseed Oil Absorption Number Y (mL/100 g)∞∞

The linseed oil absorption number Y (mL/100 g) of the negative electrode active material particles 710A is determined according to JIS K6217-4 "Carbon black for rubber industry—Fundamental characteristics—Part 4: Determination of DBP absorption number". Herein, linseed oil is used as the reagent liquid. The linseed oil is titrated in a test object powder at a constant rate by a burette, and a change in the viscosity is measured by a torquemeter. Then, the amount of the reagent liquid added per unit weight (per 100 g herein) of the test object powder that corresponds to 70% of the maximum generated torque is defined as the linseed oil absorption number. In the determination of the linseed oil absorption number Y, an oil absorption testing device S-401 manufactured by Asahisouken Inc. may be used as the measurement device. It is desirable that, the rate of adding the oil be set to 4 mL/min., and the measurement be performed at a room temperature at about 20° C. to about 25° C.

Figure 11:
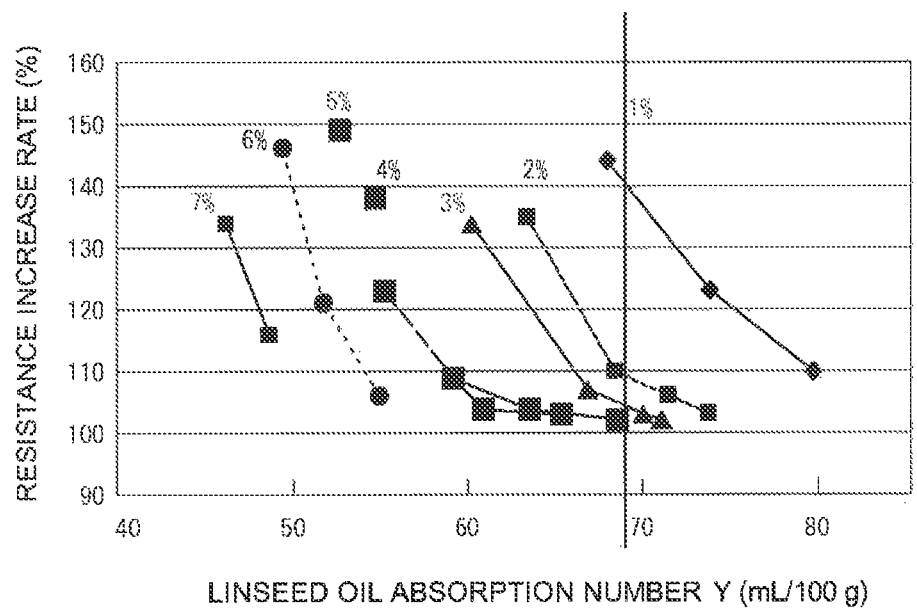
FIG. 11 is a graph illustrating the profile of a lithium-ion secondary battery according to one embodiment of the present invention, obtained by a high rate deterioration test.

FIG. 11 shows the profiles of the weight ratio X of the amorphous carbon film 750 in the negative electrode active material particles 710A, the linseed oil absorption number Y of the negative electrode active material particles 710A, and the performance of the lithium-ion secondary battery 100A.

<<Test Cell>>

Various types of negative electrode active material particles 710A were prepared each differing in the weight ratio X of the amorphous carbon film 750 in the negative electrode active material particles 710A and the linseed oil absorption number Y of the negative electrode active material particles 710A, and using the various types of negative electrode active material particles 710A, predetermined test cells were prepared. Herein, each of the test cells is a 18650-type battery having a rated capacity of 250 mAh.

<<Positive Electrode of the Test Cell>>

In the positive electrode of the test cell, a 15 μm-thick aluminum foil was used for the positive electrode current collector. The solid content of the positive electrode mixture prepared in forming the positive electrode active material layer was as follows: positive electrode active material: conductive agent:binder=87:10:3 in weight ratio. Particles of $LiNiCoMnO_2$ (lithium-nickel-cobalt-manganese composite oxide) were used as the positive electrode active material, and the same positive electrode active material was used in all the test cells. Acetylene black was used as the conductive agent. Polyvinylidene fluoride (PVDF) was used as the binder.

<<Negative Electrode of the Test Cell>>

In the negative electrode of the test cell, a 10 μm-thick copper foil was used for the negative electrode current collector. The solid content of the negative electrode mixture prepared in forming the negative electrode active material layer was as follows: negative electrode active material: thickening agent:binder=98:1:1 in weight ratio. Here, carboxymethylcellulose (CMC) was used as the thickening agent. Styrene-butadiene rubber (SBR) was used as the binder.

<<Negative Electrode Active Material Particles 710A of the Test Cell>>

The negative electrode active material particles 710A used for the test cell are as follows. The graphite particles serving as the core of the negative electrode active material particles 710A are mixed with pitch and then baked, so that the graphite particles are at least partially covered by the amorphous carbon film 750 (see FIG. 10). Herein, various types of the negative electrode active material particles 710A each differing in the weight ratio X of the amorphous carbon film 750 and the linseed oil absorption number Y are used in the various test cells. Thus, the various test cells are fabricated under the same conditions, except for the negative electrode active material particles 710A.

The performance of each of the test cells using various negative electrode active material particles 710A each differing in the weight ratio X of the amorphous carbon film 750 and the linseed oil absorption number Y was evaluated herein. A high rate deterioration test for evaluating the resistance increase rate after repeated high rate charging and high rate discharging, for example, was carried out in order to evaluate the performance of each of the test cells. The test cells are subjected to predetermined conditioning at first.

<<Conditioning>>

Each of the test cells constructed in the above-described manner is set aside for 10 hours after filling the electrolyte solution therein, and conditioning (initial charging) is carried out after the battery voltage has reached 2.0 V or higher. The conditioning is carried out according to the following procedures 1 and 2.

Procedure 1: The test cell is charged with a constant current at 1C to 4.1 V and thereafter rested for 5 minutes.

Procedure 2: After procedure 1, the test cell is charged with a constant voltage, for 1.5 hours and then rested for 5 minutes.

<<Measurement of Rated Capacity>>

After the just-described conditioning, the rated capacity is measured for each of the test cells. The measurement of rated capacity is carried out according to the following procedures 1 through 3. Herein, in order to make the influence of temperature uniform, the rated capacity is measured in a temperature environment at a temperature of 25° C.

Procedure 1: The test cell is discharged with a constant current at 1C to 3.0 V, then discharged with a constant voltage for 2 hours, and thereafter rested for 10 seconds.

Procedure 2: The test cell is charged with a constant current at 1C to 4.1 V, then charged with a constant voltage for 2.5 hours, and thereafter rested for 10 seconds.

Procedure 3: The test cell is discharged with a constant current at 0.5C to 3.0 V, then discharged with a constant voltage for 2 hours, and thereafter rested for 10 seconds.

Rated capacity: The discharge capacity (CCCV discharge capacity) obtained in the discharge process starting from the constant-current discharging and finishing with the constant-voltage discharging in Procedure 3 is defined as the rated capacity. In this test cell, the rated capacity is about 1 Ah.

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: The test cell is charged from 3 V with a constant current at 1C so as to be in a state of charge of about 60% of the rated capacity (60% SOC).

Procedure 2: After procedure 1, the test cell is charged with a constant voltage for 2.5 hours.

This enables the test cell to be adjusted to a predetermined state of charge.

<<High Rate Deterioration Test>>

Herein, the high rate deterioration test is carried out in the following manner. Each of the test cells is subjected to the above-described conditioning, then constant-current-discharged to 3.0 V, and thereafter charged with a constant current and a constant voltage to adjust the cell to a SOC (state of charge) of 60% (60% SOC: 60% of the rated capacity). Then, after repeating the high rate charge-discharge process, the resistance increase rate of the test cell is measured. Herein, in order to make the influence of temperature uniform, the high rate deterioration test is carried out in a temperature environment of about 20° C. to 25° C.

One charge-discharge cycle at high rate comprises the following (I) through (V).

(I) The test cell is discharged with a constant current of 5OC for 10 seconds.

(II) The test cell is rested for 10 seconds.

(III) The test cell is charged with a constant current of 5C for 60 seconds (1 minute).

(II) The test cell is rested for 10 minutes.

(V) The resistance of the test cell for the discharging in the procedure (I) is measured at every cycle.

One charge-discharge cycle comprising the just-described procedures (I) through (V) is repeated 3000 times. At this time, the test cell is adjusted to 60% SOC as in the above-described manner at every 100 cycles. The resistance increase rate of the test cell is calculated based on the ratio $(\Omega_E/\Omega_1)$ of the resistance $\Omega_E$ measured at the 3000th cycle to the resistance $\Omega_1$ measured at the 1st cycle.

FIG. 11 shows a graph in which the horizontal axis represents the linseed oil absorption number Y of the negative electrode active material particles 710A and the vertical axis represents the resistance increase rate, for a test cell that employs the graphite particles each at least partially covered by the amorphous carbon film 750 as the negative electrode active material particles 710A. In FIG. 11, the resistance increase rate is indicated by percentage.

Here, natural graphite is used for the graphite particles serving as the core of the negative electrode active material particles 710A. The amorphous carbon film 750 here is formed by mixing pitch with the graphite particles serving as the core of the negative electrode active material particles 710A, and then baking the mixture. The linseed oil absorption number Y here is evaluated for the powder of the negative electrode active material particles 710A before mixed in the negative electrode mixture when preparing the test cell.

The negative electrode active material particles 710A employ graphite particles each at least partially covered with an amorphous carbon film 750. In this case, as seen from FIG. 11, when the linseed oil absorption number Y is invariable, the higher the weight ratio X of the amorphous carbon film 750 is, the lower the resistance increase rate can be kept in the high rate deterioration test.

In addition, as seen from FIG. 11 the lower the linseed oil absorption number Y of the negative electrode active material particles 710A is, the higher the resistance increase rate of the lithium-ion secondary battery 100A tends to be. Moreover, the higher the weight ratio X of the amorphous carbon film 750 in the negative electrode active material particles 710A is, the lower the linseed oil absorption number Y of the negative electrode active material particles 710A tends to be, and further, the higher the resistance increase rate of the lithium-ion secondary battery 100A tends to be.

For this reason, when employing the graphite particles each at least partially covered by the amorphous carbon film 750 as the negative electrode active material particles 710A, it is desirable to take into consideration not only the oil absorption number Y but also the weight ratio X of the amorphous carbon film 750 of the negative electrode active material particles 710A in selecting the negative electrode active material particles 710A. Also, in order to suppress the dilatancy of the negative electrode mixture, it is desirable to keep the linseed oil absorption number Y of the negative electrode active material particles 710A to be appropriately low.

Here, the lithium-ion secondary battery 100A is such that the weight ratio X of the amorphous carbon film 750 in the negative electrode active material particles 710A is $0.02 \leq X \leq 0.06$, and the weight (mL/100 g) of the linseed oil absorption number Y (mL/100 g) is: 35 (mL/100 g)$\leq Y \leq 70$ (mL/100 g). Such a configuration allows the lithium-ion secondary battery 100A to achieve both a low resistance and a low manufacturing cost.

In this case, the linseed oil absorption number Y (mL/100 g) of the negative electrode active material particles 710 may be set to $Y \leq 69$ (mL/100 g), for example. This can inhibit dilatancy from occurring in the negative electrode mixture. For example, even when the solid content concentration of the negative electrode mixture is increased to 52(%), the negative electrode mixture can be coated onto the negative electrode current collector 241A without causing dilatancy.

In order to keep the resistance and the resistance increase rate low, it is desirable that, the linseed oil absorption number Y of the negative electrode active material particles 710A be 50 (mL/100 g)$\leq Y$, for example, and more preferably $Y \leq 54$ (mL/100 g). In order to keep the resistance and the resistance increase rate low, it is further preferable that the weight ratio X of the amorphous carbon film 750 in the negative electrode active material particles 710A be $X \leq 0.05$ (5%), more preferably $X \leq 0.04$ (4%).

<<Manufacturing Method of Lithium-ion Secondary Battery 100A>>

Hereinbelow, a method of manufacturing the lithium-ion secondary battery 100A will be described. The method of manufacturing the lithium-ion secondary battery 100A includes the following steps A, B, and C.

Step A is a step of preparing a negative electrode mixture in which the negative electrode active material particles 710A and a binder are mixed in a solvent (i.e., a mixture preparing step). Step B is a step of coating the negative electrode mixture prepared in step A onto a negative electrode current collector (i.e., a coating step). Step C is a step of drying the negative electrode mixture coated on the negative electrode current collector coated in step B (i.e., a drying step).

Figure 12:
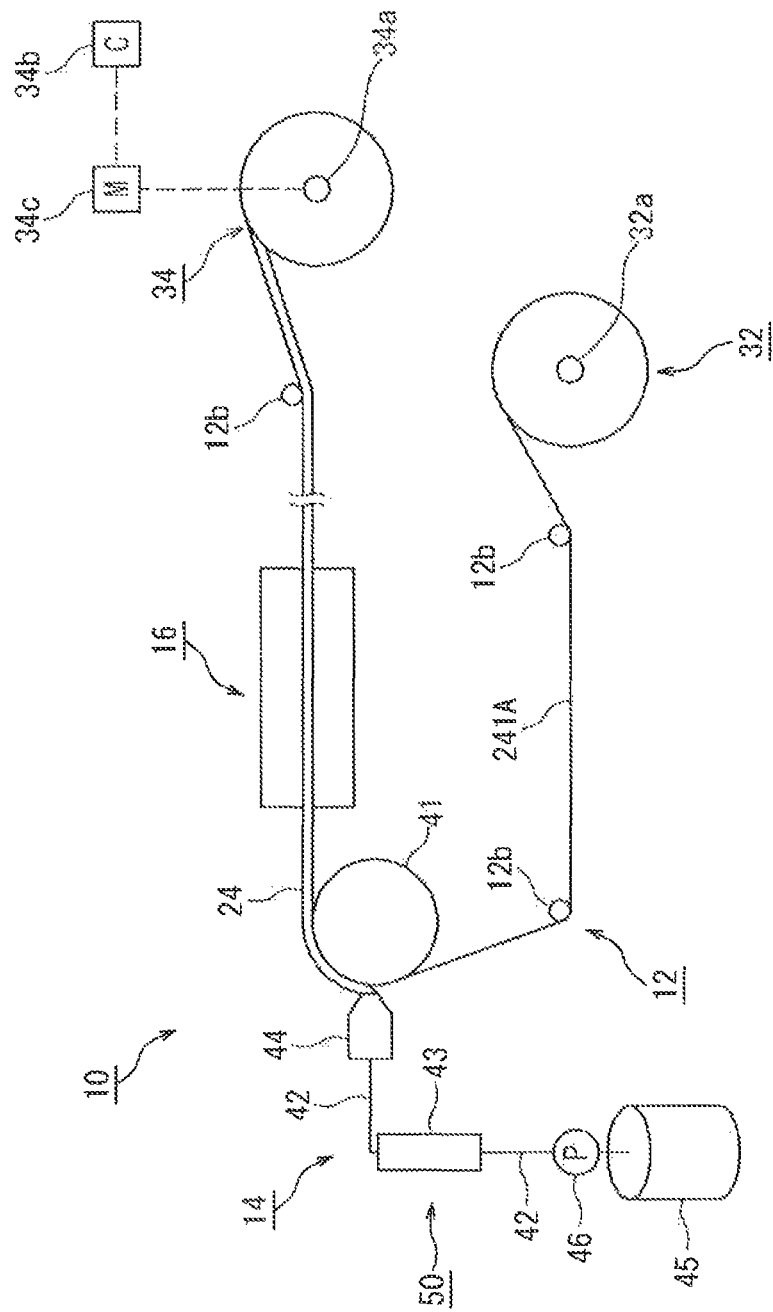
FIG. 12 is a view for illustrating the process of coating a negative electrode mixture onto a negative electrode current collector and drying.

FIG. 12 is a view for illustrating the process of coating a negative electrode mixture onto a negative electrode current collector 241 and drying the negative electrode mixture. As illustrated in FIG. 12, for example, a manufacturing apparatus 10 that embodies such a manufacturing method includes a traveling path 12 for conveying a strip-shaped current collector (the negative electrode current collector 241A herein), and an electrode material coating device 14, and a drying oven 16.

<<Negative Electrode Current Collector 241A>>

Herein, a preferred embodiment of the negative electrode current collector 241A is a foil of metal such as copper (Cu). The negative electrode current collector 241A is not necessarily limited to a metal foil. For example, the negative electrode current collector 241A may be made of an electrically conductive resin. For example, it is possible to use, as the electrically conductivity resin, a film material in which copper is deposited on a polypropylene film.

<<Traveling path 12>>

The traveling path 12 is a path in which the negative electrode current collector 241A is allowed to travel. In this embodiment, a plurality of guides 12b are disposed in the traveling path 12 along a predetermined path for conveying the negative electrode current collector 241A. A supplying unit 32 for supplying the negative electrode current collector 241A is provided at the starting end of the traveling path 12. In the supplying unit 32, the negative electrode current collector 241A is disposed, which has been wound around a winding core 32*a* in advance. From the supplying unit 32, an appropriate amount of the negative electrode current collector 241A is supplied as appropriate to the traveling path 12. A collecting unit 34 for collecting the negative electrode current collector 241A is provided at the trailing end of the traveling path 12. The collecting unit 34 winds the negative electrode current collector 241A, which has been subjected to a predetermined treatment in the traveling path 12, around a winding core 34*a*. In this embodiment, the collecting unit 34 is provided with, for example, a control unit 34*b* and a motor 34*c*. A program for controlling rotation of the winding core 34*a* of the collecting unit 34 is set in advance in the control unit 34*b*. The motor 34*c* is an actuator for driving and rotating the winding core 34*a*, and is driven by the program set in the control unit 34*b*. The electrode material coating device 14 and the drying oven 16 are disposed in that order in the traveling path 12.

<<Electrode Material Coating Device 14 (Coating Step, Step B)>>

In this embodiment, the electrode material coating device 14 is configured to apply the negative electrode mixture 24 onto the negative electrode current collector 241A that travels on a back-roll 41 arranged in the traveling path 12. As illustrated in FIG. 12, the electrode material coating device 14 has a flow passage 42, a filter 43, a die 44, a tank 45, and a pump 46. The tank 45 is a container for storing the negative electrode mixture 24. The pump 46 is a device for sending out the negative electrode mixture 24 from the tank 45 to the flow passage 42.

<<Flow Passage 42>>

The flow passage 42 is a flow passage capable of passing through a slurry in which at least graphite particles are dispersed in a solvent. In this embodiment, the flow passage 42 is formed so as to extend from the tank 45 to the die 44. The filter 43 is disposed in the flow passage 42. In the electrode material coating device 14, such a filter 43 makes up a filtering device for filtering the slurry.

<<Filter 43>>

Herein, the filter 43 may be a nonwoven fabric filter in which fibers made of resin or metal are entangled, a mesh filter in which fibers made of resin or metal are entwined, or the like. The mesh size of the filter 43 affects the size of the particles that can be removed and the viscosity of the negative electrode mixture 24 (i.e., the slurry). For this reason, it is desirable to select an appropriate filter depending on the negative electrode mixture 24 (i.e., the slurry) passed through the flow passage 42.

The negative electrode mixture 24 prepared in step A (mixture preparing step) needs to be passed through the filter 43 and the die 44 when coated onto the negative electrode current collector 241A in the coating step. This means that it is necessary to suppress dilatancy. In order to suppress dilatancy of the negative electrode mixture 24, it is desirable that the solid content concentration N of the negative electrode mixture 24 be lowered. However, when the solid content concentration N of the negative electrode mixture 24 is lowered, more energy and longer time are required for the drying, increasing the manufacturing cost.

In this embodiment, it is preferable that the negative electrode active material particles 710A (see FIG. 10) include graphite particles each at least partially covered by an amorphous carbon film, and the weight ratio X of the amorphous carbon film in the negative electrode active material particles be $0.02 \leq X \leq 0.06$. Moreover, the negative electrode active material particles 710A have a linseed oil absorption number Y (mL/100 g) of 35 (mL/100 g)$\leq Y \leq$70 (mL/100 g). Here, it is desirable that the negative electrode mixture 24 prepared in step A (i.e., the negative electrode mixture 24 prepared in the tank 45) have a solid content concentration N of 52(%)$\leq$N. This makes it possible to reduce the energy and time required for drying the negative electrode mixture 24. Therefore, the manufacturing cost, of the lithium-ion secondary battery 100A can be kept low.

In addition, in the case that the negative electrode mixture 24 is passed through the filter 43 and the die 44 when coated onto the negative electrode current collector 241A as shown in FIG. 12, it is necessary to prevent the filter 43 and the die 44 from clogging due to dilatancy. For this reason, it is desirable that the solid content concentration N of the negative electrode mixture 24 be adjusted to such a degree that the clogging due to dilatancy can be prevented. From such a viewpoint, it is desirable that the solid content concentration N of the negative electrode mixture 24 be N$\leq$60(%), more preferably N$\leq$56(%). This makes it possible to keep the mesh size of the filter 43 small to a certain degree and at the same time to prevent the clogging due to dilatancy in the coating step of the negative electrode mixture 24.

In addition, it is desirable here that the negative electrode mixture 24 prepared in step A (mixture preparing step) have a viscosity difference (G2−G1) of <0, wherein the viscosity difference (G2−G1) is a difference between a viscosity G1 at a shear rate of 10 ($s^{-1}$) as determined by a B-type viscometer and a viscosity G2 at a shear rate of 300 ($s^{-1}$) as determined by a B-type viscometer.

When the viscosity of the negative electrode mixture 24 prepared in step A is high, dilatancy is likely to occur easily because the movement of the solvent between the negative electrode active material particles in the negative electrode mixture 24 is conveyed to the adjacent negative electrode active material particles. In view of this problem, it is desirable that the negative electrode mixture prepared in step A have a viscosity difference (G2−G1) of <0, wherein the viscosity difference (G2−G1) is a difference between a viscosity G1 at a shear rate of 10 ($s^{-1}$) as determined by a B-type viscometer and a viscosity G2 at a shear rate of 300 ($s^{-1}$) as determined by a B-type viscometer. This makes it possible to inhibit dilatancy from occurring in the step of coating the negative electrode mixture 24 through the filter 43 and the die 44. Therefore, as a guideline of inhibiting dilatancy from occurring when preparing the negative electrode mixture 24 in step A, it is desirable to adjust the viscosity of the negative electrode mixture 24 so that the viscosity difference (G2−G1) will be (G2−G1)<0. Here, as the B-type viscometer, it is possible to use a B-type viscometer model BH made by TOKIMEC Inc. (currently Tokyo Keiki Inc.).

Furthermore, the negative electrode mixture 24 prepared in step A may have a difference (N2−N1) of <2(%), the difference (N2−N1) being determined after the negative electrode mixture 24 is placed in a 500 ml plastic container up to a depth of about 50 mm from the bottom thereof and set aside for 84 hours, where N1 is the solid content concentration of the negative electrode mixture 24 obtained from a surface layer portion and N2 is the solid content concentration of the negative electrode mixture 24 obtained from a bottom of the container. Here, the solid content concentration difference (N2−N1) of the negative electrode mixture 24 indicates to what degree the dispersion of the negative electrode mixture 24 can be maintained.

Figure 13:
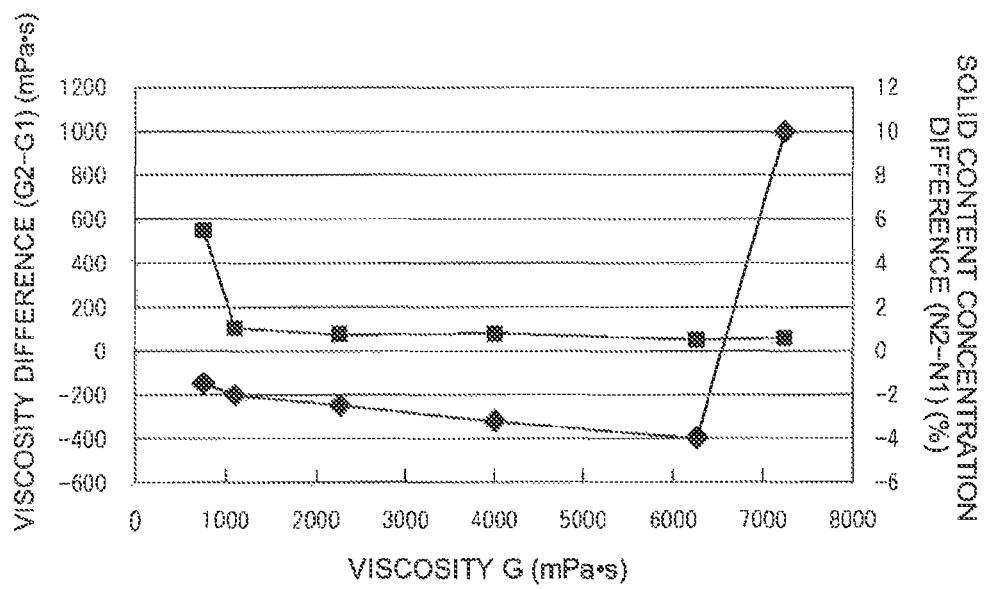
FIG. 13 is a graph illustrating the profile of viscosity G, viscosity difference (G2−G1), and solid content concentration difference (N2−N1) regarding a negative electrode mixture.
Figure 14:
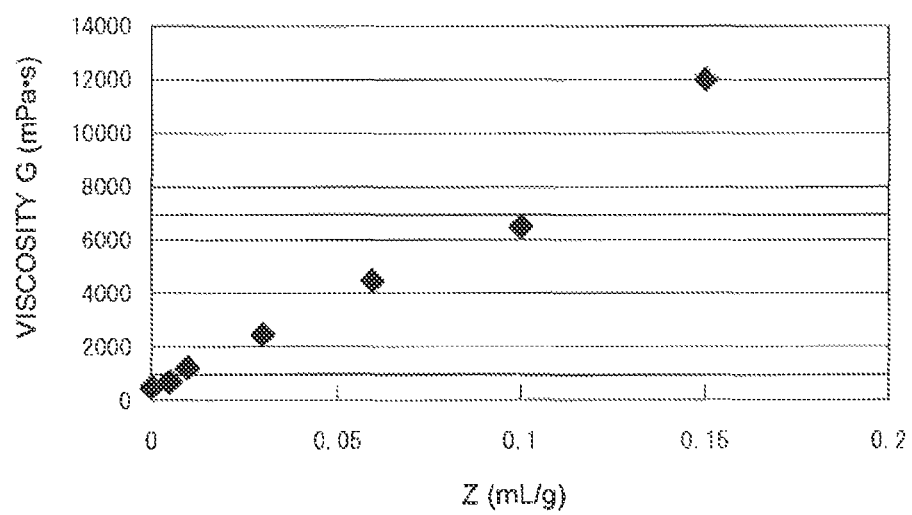
FIG. 14 is a graph illustrating the profile of difference (Z−Y) between solvent amount Z of negative electrode mixture and linseed oil absorption number Y of negative electrode active material particles.

FIG. 13 is a graph in which the horizontal axis represents the viscosity, the left vertical axis represents the viscosity difference (G2−G1), and the right vertical axis represents the solid content concentration difference (N2−N1), for negative electrode mixtures 24 prepared in step A that have varying viscosities. In the examples shown in FIG. 13, the following tendency was observed. Here, the diamond-shaped plots ♦ represent viscosity difference (G2−G1), and the square-shaped plots ■ represent solid concentration difference (N2−N1).

When the negative electrode mixture 24 prepared in step A had a viscosity G of 750 (mPa·s), the viscosity difference (G2−G1) thereof was −150 (mPa·s) and the solid content concentration difference (N2−N1) thereof was 5.4(%).

When the negative electrode mixture 24 had a viscosity G of 1100 (mPa·s), the viscosity difference (G2−G1) thereof was −200 (mPa·s) and the solid content concentration difference (N2−N1) thereof was 0.97(%).

When the negative electrode mixture 24 had a viscosity G of 2250 (mPa·s), the viscosity difference (G2−G1) thereof was −240 (mPa·s) and the solid content concentration difference (N2−N1) thereof was 0.71(%).

When the negative electrode mixture 24 had a viscosity G of 4000 (mPa·s), the viscosity difference (G2−G1) thereof was −320 (mPa·s) and the solid content concentration difference (N2−N1) thereof was 0.73(%).

When the negative electrode mixture 24 had a viscosity G of 6250 (mPa·s), the viscosity difference (G2−G1) thereof was −400 (mPa·s) and the solid content concentration difference (M2−N1) thereof was 0.42(%).

When the negative electrode mixture 24 had a viscosity G of 7250 (mPa·s), the viscosity difference (G2−G1) thereof was 1000 (mPa·s) and the solid content concentration difference (N2−N1) thereof was 0.51(%).

Thus, when the viscosity of the negative electrode mixture 24 is too low, the dispersion of the negative electrode active material particles in the negative electrode mixture 24 may not be maintained even if the negative electrode mixture 24 is set aside for a predetermined time. On the other hand, when the viscosity is too high, dilatancy may occur. Accordingly, it is preferable that the negative electrode mixture 24 prepared in step A have a viscosity G of G≤7000 (mPa·s) at a shear rate of 20 ($s^{-1}$) as determined by a B-type viscometer. It is more preferable that G≤6300 (mPa·s), still more preferably G≤6000 (mPa·s). This can prevent dilatancy from occurring. On the other hand, it is preferable that the negative electrode mixture 24 prepared in step A have a viscosity G of 1000 (mPa·s)≤G at a shear rate of 20 ($s^{-1}$) as determined by a B-type viscometer. More preferably, the viscosity G of the negative electrode mixture 24 should be 1200 (mPa·s)≤G. As a result, the dispersion capability of the negative electrode active material particles in the negative electrode mixture 24 can be maintained even if the negative electrode mixture 24 is set aside for a predetermined time. Therefore, the product quality of the lithium-ion secondary battery 100A can be improved.

When preparing the negative electrode mixture 24 prepared in step A (mixture preparing step), it is preferable that the amount of the solvent added to the negative electrode active material particles should be slightly greater than the amount corresponding to the linseed oil absorption number Y (mL/100 g). FIG. 34 is a graph illustrating the relationship between the solvent amount Z (mL/g) and the viscosity G of the resultant negative electrode mixture, where the solvent, amount Z (mL/g) is the amount, of solvent additionally added per 1 g of negative electrode active material particles, on the basis that a solvent has been added to the negative electrode active material particles in an amount corresponding to the linseed oil absorption number Y (mL/100 g). When Z is larger, the amount of the solvent in the negative electrode mixture is greater. This means that the molecular weight of CMC contained in the negative electrode mixture is maintained during kneading. When the solid content concentration is set to 54(%), for example, the viscosity of the resultant negative electrode mixture is made high.

Thus, according to the findings obtained by the present inventor, the viscosity of the resultant negative electrode mixture becomes high if the amount of the solvent is too large in kneading in step A (mixture preparing step). In that case, it is desirable that the solvent should be added in an amount corresponding to the linseed oil absorption number Y (mL/100 g) to the negative electrode active material particles, and additionally, about 0.01 ml, to about 0.1 ml, of the solvent should be added per 1 g of the negative electrode active material particles in step A (mixture preparing step). That is, on the basis that the solvent has been added to the negative electrode active material particles in an amount corresponding to the linseed oil absorption number Y (mL/100 g), the solvent Z (mL/g) that is to be added additionally per 3 g of the negative electrode active material particles should preferably be approximately 0.01 mL≤Z°0.1 mL. As a result, a negative electrode mixture having a viscosity G of about 1000 (mPa·s)≤G≤about 7000 (mPa·s) can be obtained.

In this way, it is desirable that in step A (mixture preparing step), the solvent should be added in an amount corresponding to the linseed oil absorption number Y (mL/100 g) relative to the weight of the negative electrode active material particles, and additionally, the solvent should be added in an amount of about 0.01 mL to about 0.1 mL per 1 g of the negative electrode active material particles in step A (mixture preparing step). More preferably, the amount of the solvent Z that is to be added in addition to an amount corresponding to the linseed oil absorption number Y (mL/100 g) should be set to 0.02≤Z per 1 g of the negative electrode active material particles. In addition, it is preferable that the amount of the solvent Z be Z≤0.09 per 1 g of the negative electrode active material particles. As a result, the viscosity of the negative electrode mixture obtained after hard-kneading can be set to 1000 (mPa·s)≤G≤7000 (mPa·s) more reliably. This makes it possible to improve the product quality of the lithium-ion secondary battery 100A.

Hereinabove, a lithium-ion secondary battery, a particulate material of active material particles, and a method of manufacturing active material particles according to one preferred embodiment of the invention have been described. However, the present invention is not limited to any of the embodiments described above.

As described above, the present invention contributes to improvements in the output power characteristics of lithium-ion secondary batteries. Therefore, the present invention is suitable for secondary batteries for vehicle-driving power sources, such as batteries for driving hybrid vehicles, which require a high level of output power characteristics at high rate and cycle performance, and further batteries for driving plug-in hybrid vehicles and electric vehicles, which require a particularly high level of capacity.

Figure 15:
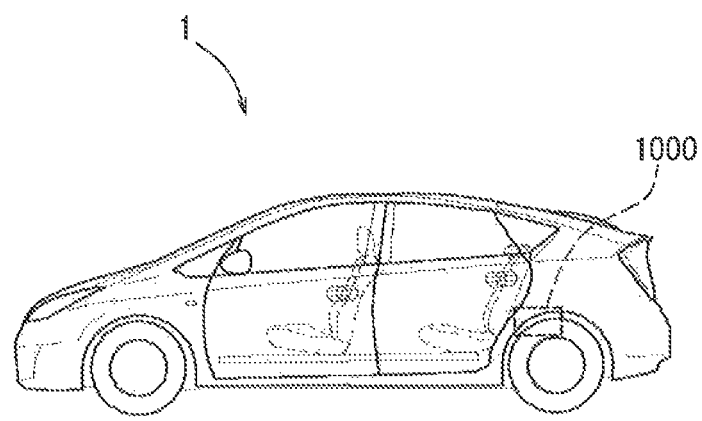
FIG. 15 is a view illustrating a vehicle incorporating a secondary battery.

In this case, as illustrated in FIG. 15, the present invention can be suitably utilized as a vehicle drive battery 1000 in the form of a battery module, in which a plurality of secondary batteries are connected and combined. In particular, the lithium-ion secondary battery according to the present invention can produce high power stably even with a low charge amount, so it can withstand the use with a lower charge amount. Therefore, the battery can be used efficiently, and at the same time, even when a high level of capacity is demanded, the number of required batteries can be reduced, resulting in a low cost.

Thus, the lithium-ion secondary battery 100 according to the present invention is especially suitable as a vehicle drive battery 1000. The lithium-ion secondary battery according to one embodiment the present invention is suitable for, for example, a lithium-ion secondary battery having a rated capacity of 3.0 Ah or higher as a battery for driving a hybrid vehicle (particularly for a plug-in hybrid vehicle) or an electric vehicle.

REFERENCE SIGNS LIST

1—Vehicle
10—Manufacturing apparatus
12—Traveling path
14—Electrode material coating device
16—Drying oven
24—Negative electrode mixture
32—Supplying unit
34—Collecting unit
41—Back-roll
42—Flow passage
43—Filter
44—Die
45—Tank
46—Pump
50—Filtering device
100, 100A—Lithium-ion secondary battery
200—Wound electrode assembly
220—Positive electrode sheet
221—Positive electrode current collector
222—Uncoated portion
223—Positive electrode active material layer
224—Intermediate portion
225—Gap (void)
240, 240A—Negative electrode sheet
241, 241A—Negative electrode current collector
242, 242A—Uncoated portion
243, 243A—Negative electrode active material layer
245—Gap (void)
262, 264—Separator
280—Electrolyte solution
290—Charger
300—Battery case
310, 312—Gap
320—Case main body
322—Joint, portion between lid and case main body
340—Lid
350—Filling port
352—Sealing cap
360—Safety vent
420—Electrode terminal
420a—Foremost end portion
440—Electrode terminal
440a—Foremost end portion
610—Positive electrode active material particle
620—Conductive agent
630—Binder
710, 710A—Negative electrode active material particle
730—Binder
750—Amorphous carbon film
1000—Vehicle drive battery

The invention claimed is:

1. A method of manufacturing a lithium-ion secondary battery, comprising:

a step A of preparing a negative electrode mixture in which negative electrode active material particles and a binder are mixed in a solvent;

a step B of coating the negative electrode mixture prepared in step A onto negative electrode current collector; and a step C of drying the negative electrode mixture coated on the negative electrode current collector coated in step B, wherein:

the negative electrode active material particles are graphite particles each at least partially covered by an amorphous carbon film, and the weight ratio X of the amorphous carbon film in the negative electrode active material particles is $0.02 < X < 0.06$;

the negative electrode active material particles have a linseed oil absorption number Y mL/100 g of 35 mL/100 g $< Y <$ 70 mL/100 g; and the negative electrode mixture prepared in step A has a solid content concentration N of $52\% < N$; and wherein, in step A, the solvent is added in an amount corresponding to the linseed oil absorption number Y mL/100 g to the negative electrode active material particles, and additionally, 0.01 ml to 0.1 ml of the solvent is added per 1 g of the negative electrode active material particles such that the amount Z mL/100 g of the solvent mixed per 100 g of the negative electrode active material particles is adjusted, with respect to the linseed oil absorption number Y mL/100 g of the negative electrode active material particles, to be $(Y+1) \leq Z \leq (Y+10)$.

2. The method of manufacturing a lithium-ion secondary battery according to claim 1, wherein the negative electrode mixture prepared in step A has a solid content concentration N of $N \leq 60\%$.

3. The method of manufacturing a lithium-ion secondary battery according to claim 2, wherein the negative electrode mixture prepared in step A has a viscosity difference (G2−G1) of $<0$, wherein the viscosity difference (G2−G1) is a difference between a viscosity G1 at a shear rate of 10 (s−1) as determined by a B-type viscometer and a viscosity G2 at a shear rate of 300 (s−1) as determined by a B-type viscometer.

4. The method of manufacturing a lithium-ion secondary battery according to claim 1, wherein the negative electrode mixture prepared in step A has a difference (N2−N1) of $<2\%$, the difference (N2−N1) being determined after the negative electrode mixture is placed in a container up to a depth of about 50 mm from the bottom thereof and set aside for 84 hours, where N1 is the solid content concentration of the negative electrode mixture obtained from a surface layer portion and N2 is the solid content concentration of the negative electrode mixture obtained from a bottom of the container.

5. The method of manufacturing a lithium-ion secondary battery according to claim 1, wherein the negative electrode mixture prepared in step A has a viscosity G of $G \leq 7000$ mPa·s at a shear rate of 20 (s−1) as determined by a B-type viscometer.

6. The method of manufacturing a lithium-ion secondary battery according to claim 5, wherein the negative electrode mixture prepared in step A has a viscosity G of 1000 mPa·s $\leq G$ at a shear rate of 20 (s−1) as determined by a B-type viscometer.

* * * * *